Figure 1:
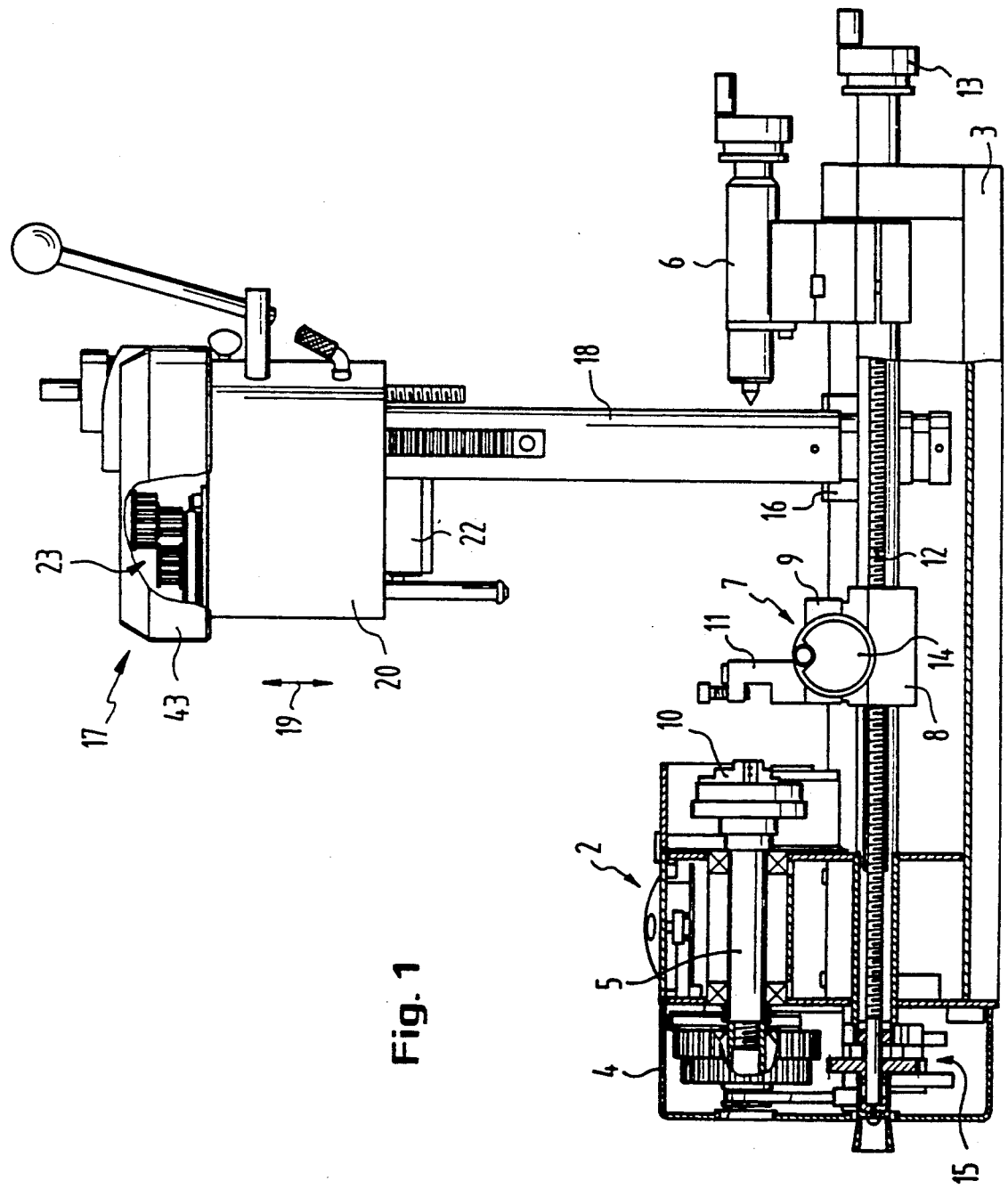

United States Patent [19]

Enzinger

[11] Patent Number: 5,090,279
[45] Date of Patent: Feb. 25, 1992

[54] VERTICAL SPINDLE PEDESTAL

[75] Inventor: Kurt Enzinger, Mittersill, Austria

[73] Assignee: EMCO MAIER GmbH, Hallein, Austria

[21] Appl. No.: 578,589

[22] Filed: Sep. 4, 1990

[30] Foreign Application Priority Data

Sep. 6, 1989 [DE] Fed. Rep. of Germany ....... 3929657

[51] Int. Cl.$^5$ ............................................. B23B 25/00
[52] U.S. Cl. .................................... 82/152; 29/27 A; 408/20; 408/135; 409/237
[58] Field of Search ................. 29/27 A; 82/152, 171; 408/20, 24, 135, 138; 409/237

[56] References Cited

U.S. PATENT DOCUMENTS

| | | | |
|---|---|---|---|
| 1,916,618 | 7/1933 | Jennings | 408/20 |
| 1,928,756 | 10/1933 | Klausmeyer | 408/135 |
| 2,084,686 | 6/1937 | Howard | 408/135 |
| 4,279,553 | 7/1981 | Cleary | 408/135 |
| 4,566,169 | 1/1986 | Vesely | 29/27 A |

FOREIGN PATENT DOCUMENTS 2629431 1/1978 Fed. Rep. of Germany ...... 409/237

Primary Examiner—Daniel W. Howell

[57] ABSTRACT

A vertical spindle pedestal, especially for attachment to a lathe, which vertical spindle pedestal includes a vertical column and a motor driven vertical spindle vertically adjustable relative to the column, the vertical column being a hollow one on which a spindle housing is vertically slidably supported. A tension band is attached to the housing and guided over a reversing roll carried by the upper end of the column to a free end connected to a tension spring located inside the hollow column and anchored to it, the vertical column further carrying means for vertically adjusting the spindle housing along its length. The means for vertically adjusting the spindle housing includes a rotatable vertical lead screw supported by the upper end of the vertical column for rotation and against axial shifting which lead screw cooperates with a lead screw nut fixed to the spindle housing.

10 Claims, 4 Drawing Sheets

VERTICAL SPINDLE PEDESTAL

The present invention concerns a vertical spindle pedestal of the type including a vertical column and a motor driven vertical spindle arranged on the column for vertical adjustment relative to the column.

In small workshops many lathes are used which can be made into a vertical drilling and milling machine by the attachment of a vertical spindle pedestal. Thereby the universality of such machines can be considerably expanded so that they can be used for special problems particularly those outside of manufacturing facilities.

Since such vertical spindle pedestals above all find use in connection with small lathes in the lower price class, it is essential that the vertical spindle pedestal be of simple construction and able to be sold at a good price. To obtain optimal universality of the entire machine it is further important that the vertical spindle pedestal be of light weight and be capable of being mounted and demounted without requiring a large amount of time.

It is therefore the object of the present invention to provide a vertical spindle pedestal of the type described above which is of simple construction and also price effective and one which can be simply and quickly mounted or demounted.

This object is solved in accordance with the invention in that the column is hollow, a spindle housing is vertically slidably supported on the column, a tension band or the like is attached to the housing and guided over a roll on the upper end of the column and has a free end connected to a tension spring located in and anchored to the column, and a means is supported by the column for vertically adjusting the spindle housing along the length of the column.

The vertical spindle pedestal includes a hollow vertical column on which a spindle housing is vertically slidably supported. In order that the weight of the spindle housing and its contents is counterbalanced a tension band or the like is fastened to the spindle housing. This band is guided over a reversing roll at the upper end of the vertical column and has its free end connected to a tension spring received in and anchored to the vertical column. This tension spring is protected by being inside of the vertical column and is aesthetically accommodated in a pleasing way. The end of the tension spring opposite to the tension band is itself anchored in the vertical column. That is, the tension spring need not in the mounting of the vertical spindle pedestal to a machine bed be attached to the machine bed, and in the demounting of the pedestal need not be detached from the machine bed. The means for vertically adjusting the spindle housing along the vertical column is itself applied to the vertical column so that also here no connection to other parts of the lathe need be made. The entire vertical spindle pedestal is a system complete in itself, so that it can be mounted in its entirety to the machine bed of a lathe and be immediately ready for use.

The vertical column is preferably formed as a tube so that it can be formed in a simple way as a turned piece.

The means for vertically adjusting the spindle housing includes, in accordance with the invention, a rotatably drivable lead screw supported at the upper end of the vertical column for rotational movement and against axial shifting relative to the vertical column, which lead screw cooperates with a lead screw nut fastened to the spindle housing. This vertical lead screw enables a finely sensitive and exact adjustment of the spindle housing with the spindle supported therein.

Additionally, a rack can be provided and fastened vertically on the vertical column for cooperation with a rack pinion supported for rotational movement in the spindle housing. The rack pinion can, for example, be operated by a swinging lever such as known in vertical drilling machines.

The spindle housing is in a preferred embodiment of the invention a section of a continuous casting with a casting axis running in the direction of the vertical column and with the spindle housing having a number of through openings extending in the direction of the casting axis. One of the through openings has an internal contour matching the external contour of the vertical column and serves for guiding the spindle housing on the vertical column.

Another of the through openings is for receiving the vertical spindle. The drive motor for the vertical spindle is arranged in a further through opening. In a fourth through opening is arranged the nut for the vertical lead screw. Since a through opening is involved, the vertical lead screw can pass entirely through such opening. That is, the vertical lead screw and therewith the vertical adjustment of the spindle housing can be larger than the height of the spindle housing The vertical lead screw is preferably provided with a hand wheel connected with a drive wheel couplable to a positioning motor mounted on the vertical column. In this way the feed drive for the vertical adjustment of the spindle housing and for the spindle supported thereby can selectively be carried out either manually or with the use of the motor.

In a preferred embodiment of the invention the drive wheel is formed of one piece with the hand wheel so that it for example can be made in a simple way as a precision injection molded part.

An especially simply constructed implementation is achieved if the drive wheel is formed as a toothed belt pulley which is connected by a toothed belt with a toothed wheel fastened to the output shaft of the drive motor. Such a toothed belt can be quickly mounted or demounted in a simple way with workshop means and by operating persons without special fitting features. Therefore the possibility exists that when a manual feed drive is provided the drive motor can be disconnected from the hand wheel so that the drive motor need not be moved with the hand wheel.

An exemplary embodiment of the invention is illustrated in the drawings and described in more detail in the following description. The drawings are, FIG. 1—A side view, partly in elevation and partly in section of a lathe with a vertical spindle pedestal mounted to its machine bed.

Figure 2:
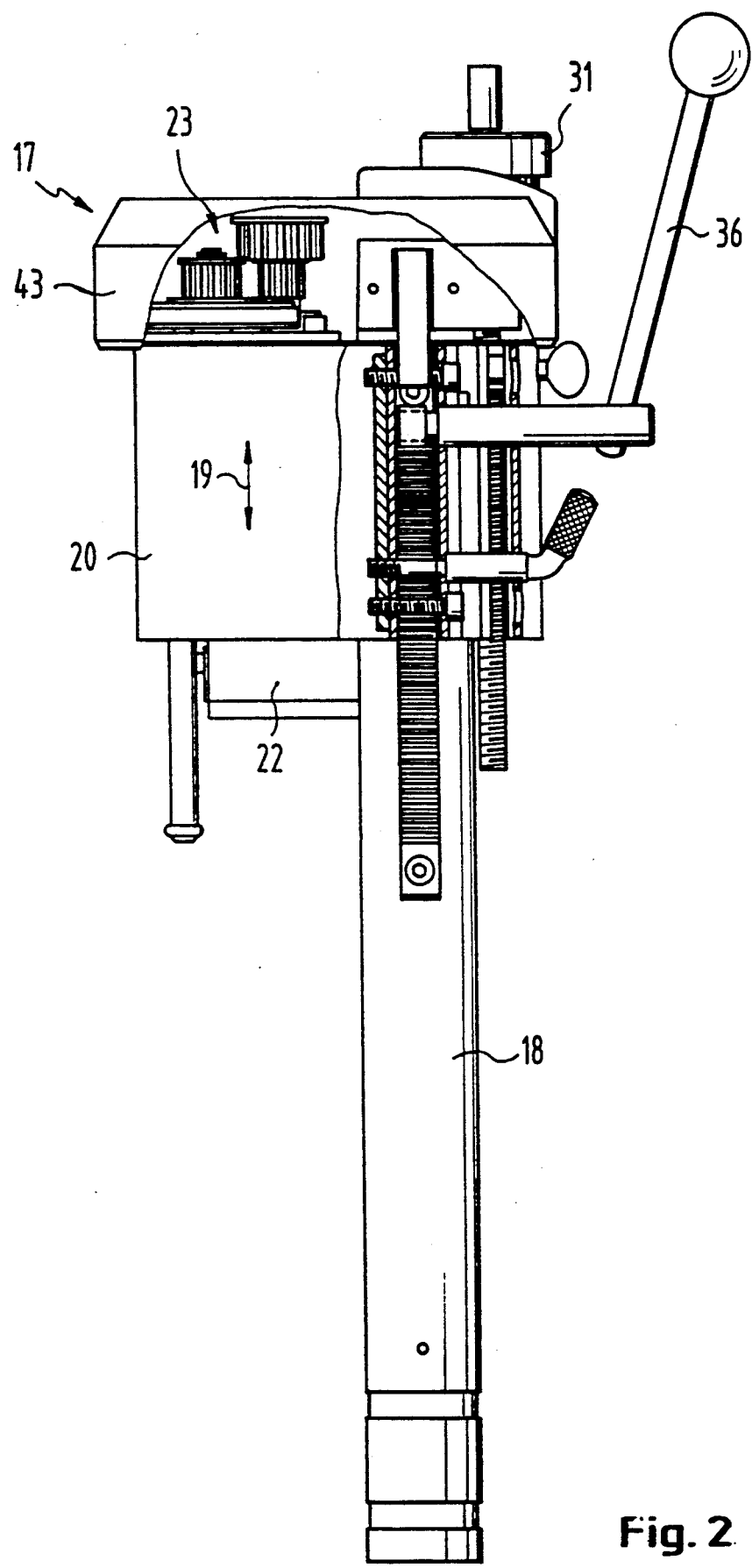

FIG. 2—An enlarged side view of the vertical spindle pedestal of FIG. 1.

Figure 3:
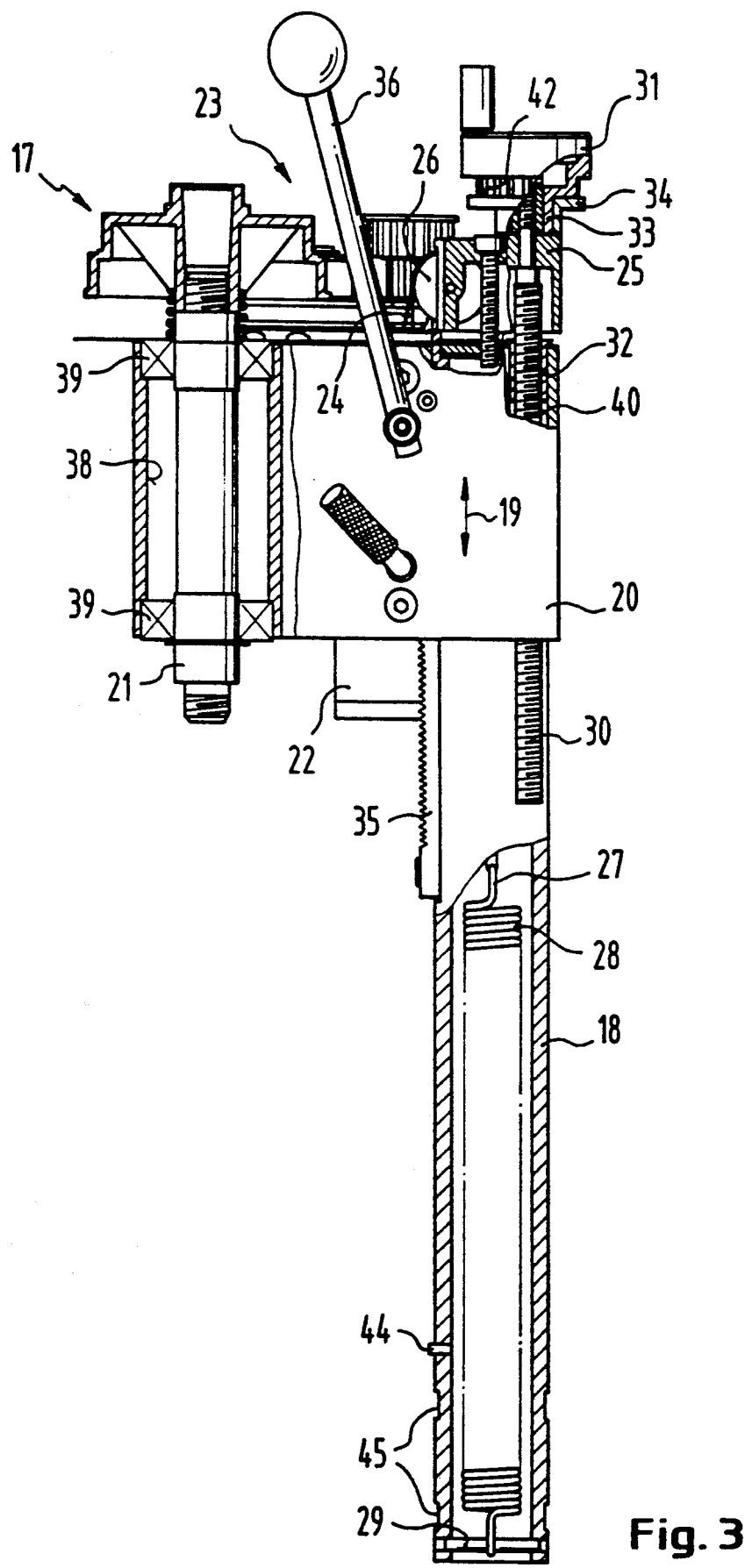

FIG. 3—A rear view of the vertical spindle pedestal of FIG. 2.

Figure 4:
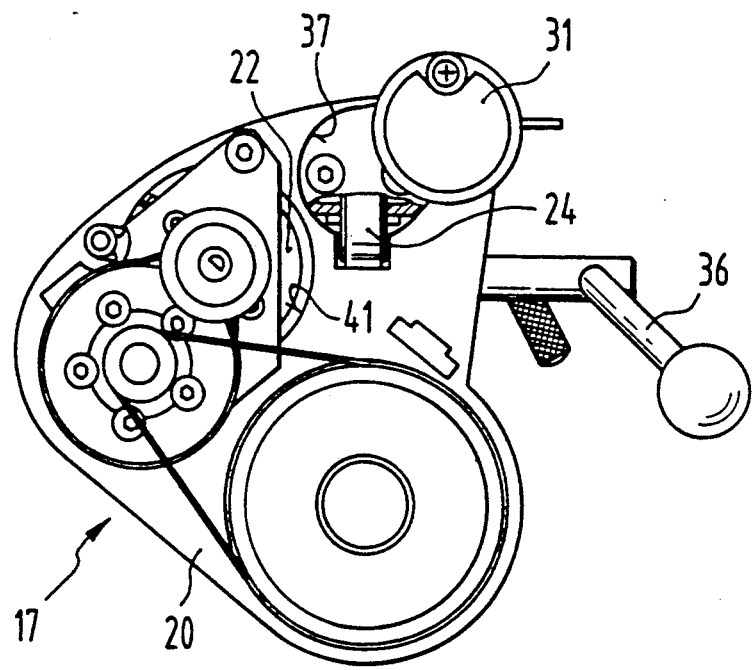

FIG. 4—A plan view of the vertical spindle pedestal of FIG. 1.

FIG. 1 shows a lathe 2 with a machine bed 3, a main spindle stock 4 fixed to the bed and having a motor driven main spindle 5, a tail stock 6 arranged on the bed for slidable movement in the direction of the main spindle axis, and a cross table which in a known way includes a longitudinal table 8 slidable in the direction of the main spindle axis and on the table 8 a transverse table 9 movable transversely relative to the longitudinal table 8. A work piece, on which a rotational machining operation is to be carried out, is clamped in the chuck 10 of the main spindle 5 and, if need be, is engaged at its free end by the tail spindle of the tail stock 6. A tool, for example, a turning bit, is clamped into a too) holder 11 fastened to the transverse table 9.

For the adjustment of the longitudinal table 8 a longitudinal lead screw 12 with external threads is supported in the machine bed 3 for rotational movement and against sliding movement in the direction of the axis of the main spindle 5, and it can be rotated by a hand wheel 13 rotatably fixed to it. This externally threaded longitudinal lead screw 12 cooperates with a lead screw nut fixed to the longitudinal table 8.

For adjustment of the transverse table 9 a transverse lead screw is supported on the longitudinal table 8 for rotation relative thereto and against axial sliding movement relative thereto, which transverse lead screw is rotatable by a hand wheel 14 rotatably fixed to it. This transverse lead screw, which is provided with an external thread, cooperates with a lead screw nut fixed to the transverse table 9.

To be able to carry out helical turning work, the longitudinal lead screw 12 can be coupled with the main spindle 5 or with the main spindle drive by a drive and coupling device 15 arranged at its end opposite to the hand wheel 13, with different drive ratios being selectable to achieve different helix inclinations.

A vertical spindle pedestal 17 is insertable in a receiving fitting 16 of the machine bed 3. The vertical spindle pedestal 17 includes in general a vertical column 18, a spindle housing 20 slidable in the vertical direction (double arrow 19) on the vertical column 18, and a vertical spindle 21 (see FIG. 3) arranged in the spindle housing 20 and coupled with a rotational drive. The vertical spindle 21, the spindle drive motor 22 and a power transmitting drive 23 formed as a belt drive are connected with the spindle housing 20 and move up and down with it.

To provide a counter balance for the spindle housing 20 and its contents, an elongated flexible tension member in the form of a tension band 24 is fastened to the spindle housing 20, which band is guided over a reversing roll 26 supported by a bearing block 25 arranged in the upper end of the vertical column 18, the free end 27 of the tension band 24 being connected to a tension spring 28 arranged in the hollow tubular shaped vertical column 18, the lower end of which spring is anchored to the vertical column 18 by an anchoring element 29.

The mean for vertically adjusting the spindle housing 20 comprise a vertical lead screw 30 supported for rotation and axially fixed in a support block 25, to the upper end of which lead screw 30 is fastened a hand wheel 31. The vertical lead screw 30 is provided with an external thread cooperating with the internal thread of a lead screw nut 32 fixed to the spindle housing 20, so that by rotating the vertical lead screw 30 the spindle housing 20 is vertically adjusted in the direction of the double arrow 19.

A scale ring 34 is frictionally supported on a hub-like continuation 33 of the hand wheel 31, with a scale marking formed on the scale ring 34 cooperating with an opposite marking arranged for example on the bearing block 25 or on another component fastened to the machine, so that a fine adjustment of the spindle housing 20 is possible.

For coarse adjustment of the spindle housing 20 an additional adjusting device is provided and essentially includes a rack 35 fastened to the vertical column 18, which rack cooperates with a rack pinion rotatably supported in the spindle housing 20 and operable by means of a hand lever 36, which in itself is known and is therefore not illustrated in greater detail. This adjustment device serves in general for vertically adjusting the vertical spindle in a drilling operation.

The spindle housing 20 is a portion of a continuous casting with a casting axis running in the direction of the vertical column; and it includes a number of through openings extending in the direction of the casting axis for receiving the different components arranged in the spindle housing 20 as well as serving to provide a vertical sliding support for the housing on the vertical column 18.

A first through opening 37 has in cross section (see FIG. 4) an internal shape corresponding to the external shape of the vertical column 18 with the external shape of the vertical column 18 also including the rack 35. The through opening 37 can in the continuous casting of the spindle housing 20 he made with high accuracy. The finishing work can follow in a simple way by turning and broaching.

A second through opening 38 (see FIG. 3) serves to receive the vertical spindle 21 or the spindle bearing 39.

A third through opening 40 takes up the lead screw nut 32 as well as the lead screw 30, which lead screw can pass through the entire length of this through opening 40.

A fourth through opening 41 serves to receive the spindle drive motor 22.

As especially shown in FIG. 3, formed on the hand wheel 31 of the vertical spindle 30 is a section serving as a toothed belt pulley 42 connected by a toothed belt with a positioning motor connected for example with the bearing block 25. In this way a motorized adjustment of the spindle housing 20 is possible. The positioning motor can be connected with an NC control so that the drive of the vertical spindle pedestal 17 can be made automatically.

As shown in FIGS. 1 and 2 the upper side of the spindle housing 21 can be covered by a cover 43 from which essentially only the hand wheel 31 extends.

The vertical column 18 is provided in its lower region with a stop pin 44 which in the mounting of the vertical spindle pedestal 17 engages an opposite surface of the receiving fitting 16 and thereby defines the insertion depth of the vertical column 18 into the receiving fitting. Moreover, in the area of the lower end of the vertical column 18 are formed two circumferential grooves 45 which can receive non-illustrated fixing screws for fixing the vertical spindle pedestal 17 in the axial direction.

I claim:

1. A vertical spindle pedestal, especially for attachment to a lathe, which vertical spindle pedestal includes a vertical column and a motor driven vertical spindle arranged on the column for vertical adjustment relative thereto, characterized by the vertical column being hollow, a spindle housing vertically slidably supported on the column, an elongated flexible tension member fastened to the housing and guided over a reversing roll carried by the upper end of the column and having a free end connected to a tension spring located in and anchored to the hollow vertical column, and means supported by the vertical column for vertically adjusting the spindle housing along the length of the vertical column, the means for vertically adjusting the spindle housing including a rotatably drivable vertical lead screw supported at its upper end by the vertical column for rotation and against axial shifting, and a spindle nut cooperating with the lead screw and carried by the spindle housing.

2. A vertical spindle pedestal, especially for attachment to a lathe, which vertical spindle pedestal includes a vertical column and a motor driven vertical spindle arranged on the column for vertical adjustment relative thereto, characterized by the vertical column being hollow, a spindle housing vertically slidably supported on the column, an elongated flexible tension member fastened to the housing and guided over a reversing roll carried by the upper end of the column and having a free end connected to a tension spring located in and anchored to the hollow vertical column, and means supported by the vertical column for vertically adjusting the spindle housing along the length of the vertical column, the spindle housing being a section of a continuously cast part having a casting axis extending in the direction of the vertical column, with the spindle housing having a plurality of through openings extending in the direction of the casting axis.

3. A vertical spindle pedestal according to claim 2 further characterized in that one of said through openings in cross section has an internal contour matching the external contour of the vertical column.

4. A vertical spindle pedestal according to claim 2 further characterized in that one of said through openings is formed so as to receive the vertical spindle.

5. A vertical spindle pedestal according to claim 2 further characterized in that one of said through openings is formed to receive a drive motor for the vertical spindle.

6. A vertical spindle pedestal according to claim 2 further characterized in that the means for vertically adjusting the spindle housing includes a rotatably drivable vertical lead screw supported at its upper end by the vertical column for rotation and against axial shifting and a spindle nut cooperating with the lead screw and carried by the spindle housing, and in that one of said through openings is formed to receive the lead screw nut and for the passage therethrough of the vertical lead screw.

7. A vertical spindle pedestal according to claim 1 further characterized in that the vertical lead screw is provided with a hand wheel which is fixedly connected with a drive wheel couplable to a positioning motor carried by the spindle housing.

8. A vertical spindle pedestal according to claim 7 further characterized in that the drive wheel is formed of one piece with the hand wheel.

9. A vertical spindle pedestal according to claim 7 further characterized in that said drive wheel is formed as a toothed belt pulley.

10. A vertical spindle pedestal according to claim 2 further characterized in that the means for vertically adjusting the spindle housing includes a rotatably drivable vertical lead screw supported at its upper end by the vertical column for rotation and against axial shifting, and a spindle nut cooperating with the lead screw and carried by the spindle housing.

* * * * *